(12) United States Patent
Inagaki (10) Patent No.: US 9,393,956 B2
(45) Date of Patent: Jul. 19, 2016

(54) PARKING SUPPORT APPARATUS

(71) Applicant: AISIN SEIKI KABUSHIKI KAISHA, Kariya-shi, Aichi-ken (JP)

(72) Inventor: Hiroki Inagaki, Okazaki (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/501,838

(22) Filed: Sep. 30, 2014

(65) Prior Publication Data

US 2015/0100177 A1    Apr. 9, 2015

(30) Foreign Application Priority Data

Oct. 4, 2013    (JP) ................................. 2013-209673

(51) Int. Cl.
*B60W 30/06* (2006.01)
*B62D 15/02* (2006.01)

(52) U.S. Cl.
CPC ............. *B60W 30/06* (2013.01); *B62D 15/027* (2013.01); *B62D 15/0285* (2013.01)

(58) Field of Classification Search
CPC ... B60W 30/06; B62D 15/027; B62D 15/028; B62D 15/0285
USPC .......................................................... 701/1
See application file for complete search history.

(56) References Cited

U.S. PATENT DOCUMENTS

| | | | |
|---|---|---|---|
| 2005/0055139 A1* | 3/2005 | Tanaka | B62D 15/0285 701/1 |
| 2008/0154464 A1 | 6/2008 | Sasajima et al. | |
| 2009/0259365 A1* | 10/2009 | Rohlfs | B62D 15/028 701/41 |
| 2010/0049402 A1* | 2/2010 | Tanaka | B60R 1/00 701/41 |
| 2013/0038714 A1* | 2/2013 | Ichinose | B60R 1/00 348/118 |
| 2013/0166190 A1* | 6/2013 | Ikeda | B62D 15/0285 701/400 |
| 2015/0039173 A1* | 2/2015 | Beaurepaire | B60W 30/06 701/23 |

FOREIGN PATENT DOCUMENTS

JP    2008-179345 A    8/2008

* cited by examiner

*Primary Examiner* — John Q Nguyen
*Assistant Examiner* — Anshul Sood
(74) *Attorney, Agent, or Firm* — Sughrue Mion, PLLC (57) ABSTRACT

A parking support apparatus includes: a host vehicle positional information acquisition unit acquiring host vehicle positional information indicating a current position of a vehicle; an obliqueness calculation unit calculating obliqueness between a vehicle length direction and a longitudinal direction of the parking space, based on the host vehicle positional information; an obliqueness correction path calculation unit calculating an obliqueness correction path along which a position of the vehicle reaches a front end of the parking space, based on the obliqueness when the vehicle travels forward from a stop position at a steering angle; and a centering path calculation unit calculating a centering path which has a width at a central portion of the parking space in a width direction and along which the vehicle travels forward toward a central region set in the longitudinal direction, after a position of the vehicle reaches the front end of the parking space.

7 Claims, 6 Drawing Sheets

PARKING SUPPORT APPARATUS

CROSS REFERENCE TO RELATED APPLICATIONS

This application is based on and claims priority under 35 U.S.C. §119 to Japanese Patent Application 2013.209673, filed on Oct. 4, 2013, the entire contents of which are incorporated herein by reference.

TECHNICAL FIELD

This disclosure relates to a parking support apparatus supporting three-point-turn traveling performed to correct positional deviation of a vehicle which stops at a parking lot.

BACKGROUND DISCUSSION

In the related art, a parking support apparatus has been utilized to support a parking operation for a driver parking a vehicle in a garage. Such a type of technology is disclosed in JP-A-2008-179345 (Reference 1).

In Reference 1, an automatic vehicle parking control apparatus performs three-point-turn traveling by performing automatic steering until the vehicle stops at the center of an expected parking spot when parking the vehicle in a parking space located on a side with respect to a traveling direction of the vehicle.

According to the technology disclosed in Reference 1, steering control is simultaneously performed as the vehicle travels forward from an initial position. Therefore, depending on an amount of the steering, there is a possibility that a host vehicle may come into contact with a vehicle which is parked in an adjacent parking space next to the parking space during the three-point-turn traveling. In order to prevent the contact between the vehicle parked in the adjacent parking lot and the host vehicle, minimizing the amount of steering is considered. In this case, it takes time for moving the host vehicle to the expected position.

SUMMARY

Thus, a need exists for a parking support apparatus which is not suspectable to the drawback mentioned above.

An aspect of this disclosure is directed to a parking support apparatus including a host vehicle positional information acquisition unit that acquires host vehicle positional information indicating a current position of a vehicle which stops at a parking space; an obliqueness calculation unit that calculates obliqueness between a vehicle length direction of the vehicle which stops at the parking space and a longitudinal direction of the parking space, based on host vehicle positional information; an obliqueness correction path calculation unit that calculates an obliqueness correction path along which a predetermined location of the vehicle determined on the basis of a front end of the vehicle within a range equal to or less than a width of the parking space reaches a front end of the parking space, based on the obliqueness when the vehicle travels forward from a stop position of the vehicle at a predetermined steering angle; and a centering path calculation unit that calculates a centering path which has a predetermined width at a central portion of the parking space in a width direction orthogonal to the longitudinal direction thereof and along which the vehicle travels forward toward a central region set to extend from the parking space in the longitudinal direction, after a predetermined location of the vehicle reaches the front end of the parking space.

With this configuration, even when the vehicle which temporarily stops at the parking lot does not stop at the central portion of the parking lot in the width direction or when the longitudinal direction of the parking lot and the vehicle length direction of the vehicle are not parallel to each other, the vehicle can leave the parking lot without coming into contact with objects (for example, other vehicles) present around the host vehicle. After leaving the parking lot, the vehicle can travel toward a position in the front of the central portion of the parking lot in the width direction so that the vehicle can proceed toward the central portion of the parking lot in the width direction by traveling reversely thereafter. In this manner, according to the parking support apparatus, a vehicle which stops at the parking lot can be prevented from coming into contact with surrounding objects, and the three-point turn can be easily performed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A parking support apparatus according to an embodiment disclosed here is configured to include a function supporting three-point-turn traveling of a vehicle which stops at a parking space. Hereinafter, a parking support apparatus 100 of the present embodiment will be described in detail.

Figure 1:
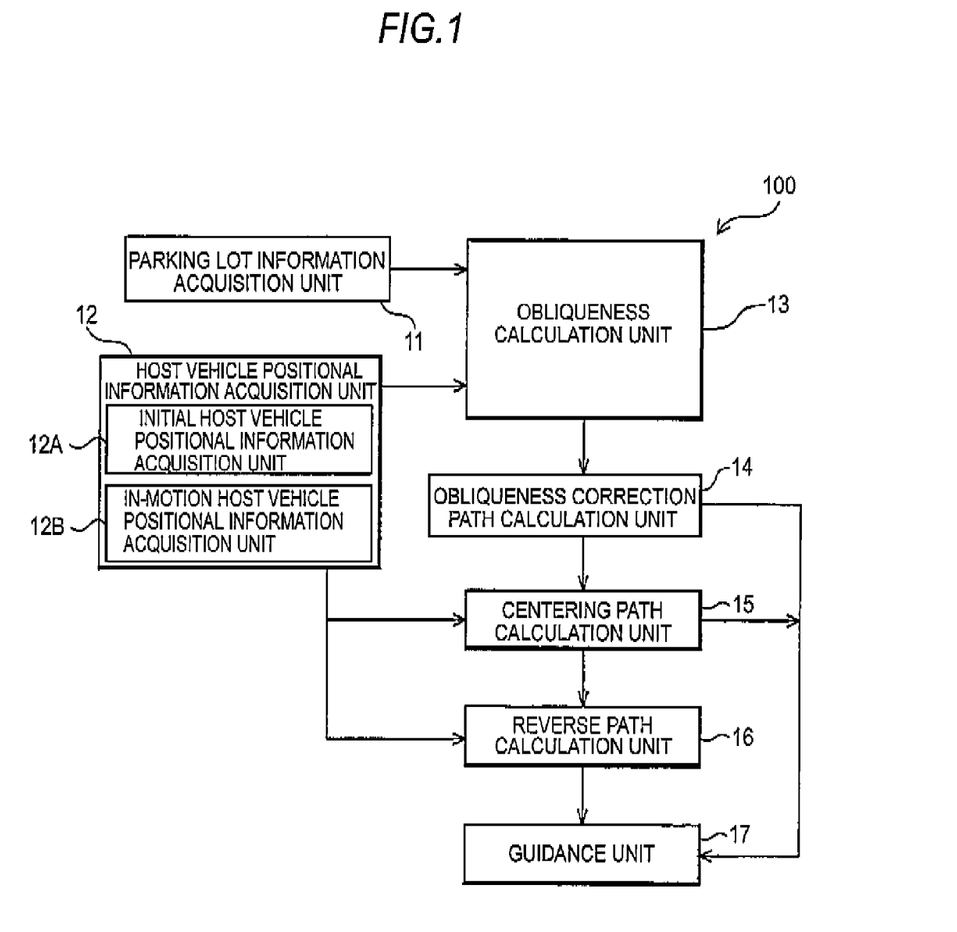
FIG. 1 is a block diagram schematically illustrating a configuration of a parking support apparatus.

FIG. 1 illustrates a schematic block diagram of a configuration of the parking support apparatus 100 of the present embodiment. As illustrated in FIG. 1, the parking support apparatus 100 is configured to include each of functional units such as a parking space information acquisition unit 11, a host vehicle positional information acquisition unit 12, an obliqueness calculation unit 13, an obliqueness correction path calculation unit 14, a centering path calculation unit 15, a reverse path calculation unit 16, and a guidance unit 17. A CPU is a core member for each of the functional units, and the aforementioned functional units are established in hardware or software, or in both thereof so as to perform various types of processing in respect of supporting a driver when performing three-point turn with a vehicle 1. In the present embodiment, the parking support apparatus 100 is provided in the vehicle 1.

Figure 2:
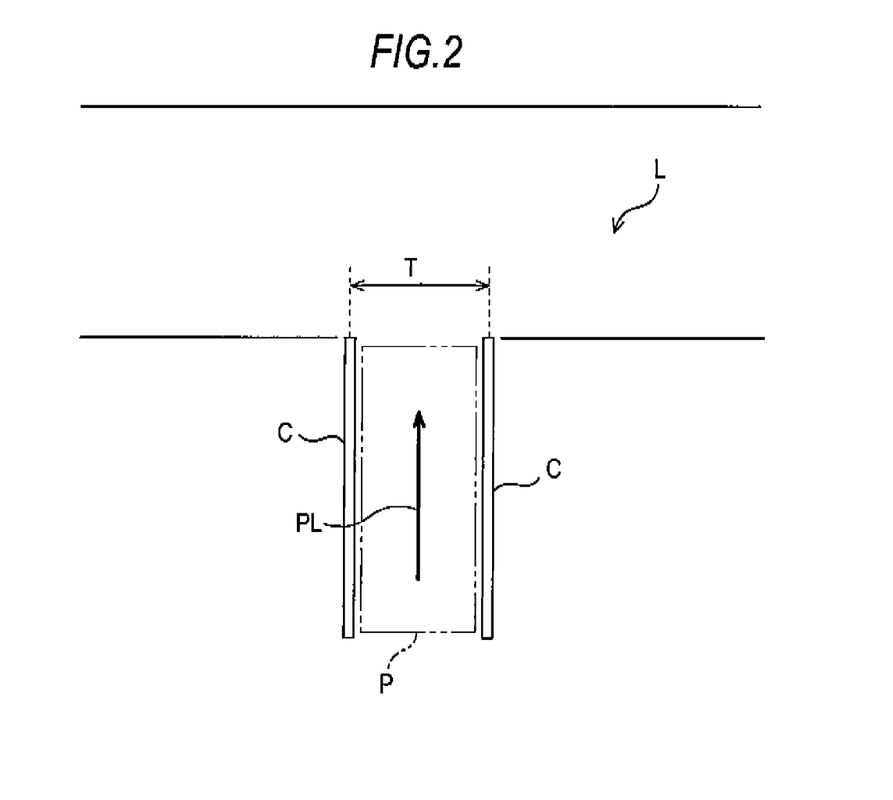
FIG. 2 is a diagram illustrating a width of a parking space.

The parking space information acquisition unit 11 acquires parking lot information indicating a parking space P which has a predetermined angle with respect to a road L illustrated in FIG. 2, and in which the vehicle 1 is subjected to so-called parking-in-the-garage. Such a parking space P is defined by an obstruction C such as white lines, for example. The parking space information indicating the parking space P is information which defines a position of the parking space P or an azimuth in which a longitudinal direction PL of the parking space P is oriented. The longitudinal direction PL of the parking space P is a direction parallel to a long side of a rectangular shape defining the parking space P. In the present embodiment, such parking space information can be acquired by adopting image recognition of captured images around the vehicle 1 acquired by a camera provided in the vehicle 1, for example.

The parking space information acquisition unit 11 acquires coordinates defining such a parking space P. As the coordinates to define the parking space P, it is favorable to use coordinates in a coordinate system which is adopted in the parking support apparatus 100 when performing various calculations by the parking support apparatus 100. Various known technologies can be adopted in respect of setting such a parking space P, thereby omitting the descriptions thereof. The parking space information acquired by the parking space information acquisition unit 11 is transmitted to the below-described obliqueness calculation unit 13.

Figure 3:
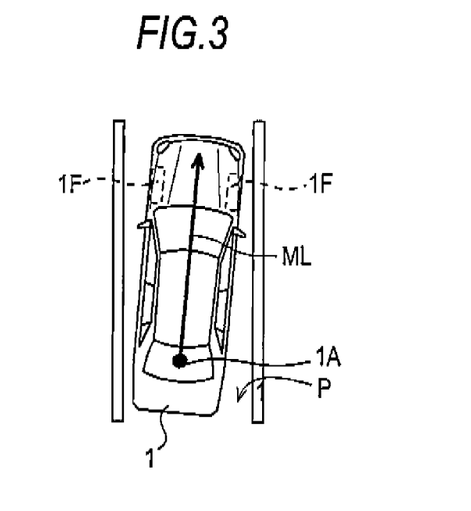
FIG. 3 is a diagram illustrating a vehicle length direction of a vehicle.

The host vehicle positional information acquisition unit 12 acquires host vehicle positional information indicating a current position of the vehicle 1 which stops at the parking space P. Here, in the present embodiment, the vehicle 1 stops at the parking space P before performing the three-point-turn traveling of the embodiment disclosed here. Such a position is not particularly limited. However, the vehicle 1 stops while causing a vehicle length direction ML of the vehicle 1 to be along the longitudinal direction PL of the parking space P. The vehicle length direction ML of the vehicle 1 is a direction of a line virtually connecting a front central portion and a rear central portion in a top view of the vehicle 1, as illustrated in FIG. 3.

The host vehicle positional information acquisition unit 12 acquires the host vehicle positional information indicating a current position of the vehicle 1 which stops at such a parking space P. The host vehicle positional information acquisition unit 12 is configured to include an initial host vehicle positional information acquisition unit 12A which acquires initial host vehicle positional information indicating a position of the vehicle 1 which stops at the parking space P, and an in-motion host vehicle positional information acquisition unit 12B which acquires in-motion host vehicle positional information indicating a position of the vehicle 1 varying in accordance with a movement of the vehicle 1. Hereinafter, the initial host vehicle positional information and the in-motion host vehicle positional information will be described as the host vehicle positional information, except when needed to be specifically distinguished. The host vehicle positional information indicates a relative position on the basis of the parking space P and can be indicated in coordinates on the basis of the parking space P. The host vehicle positional information includes information indicating an azimuth in which the vehicle length direction ML of the vehicle 1 is oriented. Such host vehicle positional information can be acquired by adopting at least one of a camera, ultrasonic sonar, and a GPS sensor provided in the vehicle 1. Similarly to target parking positional information, the host vehicle positional information acquired in such a manner is converted into a coordinate system which is adopted in calculations of the parking support apparatus 100, thereby being transmitted to the below-described obliqueness calculation unit 13.

Figure 4:
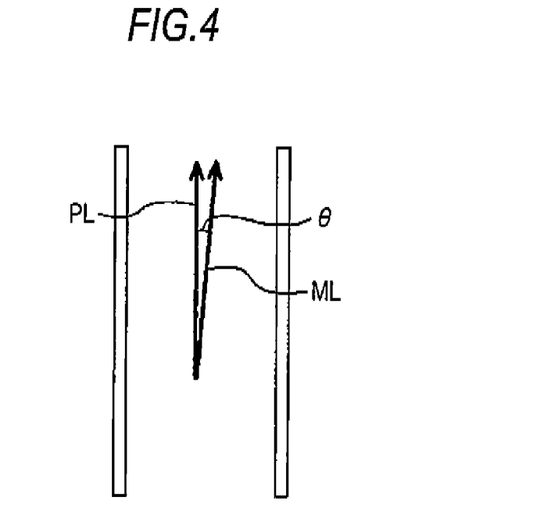
FIG. 4 is a diagram illustrating obliqueness between a longitudinal direction of the parking space and the vehicle length direction of the vehicle.

The obliqueness calculation unit 13 calculates obliqueness between the vehicle length direction ML of the vehicle 1 which stops at the parking space P, and the longitudinal direction PL of the parking space P, based on the host vehicle positional information. The host vehicle positional information is transmitted from the aforementioned host vehicle positional information acquisition unit 12. The coordinates of the parking space P defining the longitudinal direction PL of the parking lot P is transmitted from the aforementioned parking lot information acquisition unit 11 as the parking space information. The obliqueness between the vehicle length direction ML and the longitudinal direction PL is obliqueness of the vehicle 1 in the vehicle length direction ML with respect to the parking space P in the longitudinal direction PL. In other words, the obliqueness thereof corresponds to an angle $\theta$ indicating an angular difference between the longitudinal direction PL and the vehicle length direction ML as illustrated in FIG. 4. The obliqueness calculation unit 13 calculates the angle $\theta$ which is the angular difference between the longitudinal direction PL and the vehicle length direction ML. A calculated result of the obliqueness calculation unit 13 is transmitted to the below-described obliqueness correction path calculation unit 14.

When the vehicle 1 travels forward from a stop position of the vehicle 1 at a predetermined steering angle, the obliqueness correction path calculation unit 14 calculates an obliqueness correction path KR along which a predetermined location of the vehicle 1 determined on the basis of a front end of the vehicle 1 within a range equal to or less than a width T of the parking space P reaches a front end of the parking space P, based on the obliqueness thereof. The stop position of the vehicle 1 is a position within the parking space P at which the vehicle 1 stops. The vehicle 1 traveling forward at a predetermined steering angle denotes that the vehicle 1 travels forward so as to leave the parking space P. The steering angle at the time of traveling forward is a steering angle inhibiting the vehicle 1 from deviating from the width T of the parking space P illustrated in FIG. 2, when the vehicle 1 travels forward. The steering angle thereat also allows a predetermined location of the vehicle 1 determined on the basis of the front end of the vehicle 1 to reach the front end of the parking space P. In the present embodiment, a predetermined location of the vehicle 1 determined on the basis of the front end of the vehicle 1 corresponds to a position of a front wheel 1F of the vehicle 1 which travels reversely with respect to the parking space P and stops. The front end of the parking space P is an end portion on the front side of the parking space P. In this manner, the path along which the vehicle 1 travels from the stop position of the vehicle 1 until the front wheel 1F of the vehicle 1 reaches the front end of the parking space P is named as the obliqueness correction path KR (refer to FIG. 6B) for the reason that the obliqueness of the stop position of the vehicle 1 with respect to the parking space P is corrected. The obliqueness correction path calculation unit 14 calculates the obliqueness correction path KR based on the calculated result of the obliqueness calculation unit 13. The obliqueness correction path KR obtained by the obliqueness correction path calculation unit 14 is transmitted to the centering path calculation unit 15 and the guidance unit 17 described below.

The centering path calculation unit 15 calculates a centering path DK which has a predetermined width at a central portion of the parking space P in a width direction PM orthogonal to the longitudinal direction PL thereof and along which the vehicle 1 travels forward toward a central region D set to extend from the parking space P in the longitudinal direction PL, after a predetermined location of the vehicle 1 reaches the front end of the parking space P. A predetermined location of the vehicle 1 after reaching the front end of the parking space P denotes the front wheel 1F of the vehicle 1 after reaching the front end of the parking space P. The width direction PM orthogonal to the longitudinal direction PL of the parking space P is the direction matching the width direction of the parking space P illustrated in FIG. 5.

Figure 5:
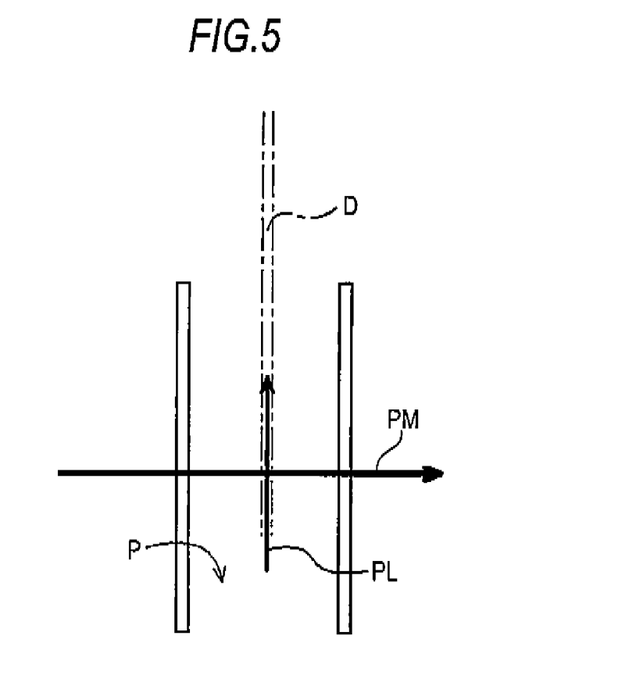
FIG. 5 is a diagram illustrating a central region.

As illustrated in FIG. 5, the central region D is provided to extend from the parking space P toward the front thereof with a predetermined width. It is favorable to cause such a central region D to be several tens of centimeters, for example. Naturally, it is possible to set the central region D wider or narrower than the above dimension. The centering path calculation unit 15 calculates the centering path DK that is a path along which the vehicle 1 having the position of the front wheel 1F reaching the front end of the parking space P travels forward so as to cause a reference position 1A (refer to FIG. 3) of the vehicle 1 to enter the central region D.

Here, in the present embodiment, after a predetermined location of the vehicle 1 reaches the front end of the parking space P, the centering path calculation unit 15 calculates the centering path DK including a fixed steering angle path KK along which the vehicle 1 travels forward toward the central region being fixed at a certain steering angle. In other words, in the present embodiment, when the vehicle 1 travels forward so as to cause the reference position 1A (refer to FIG. 3) of the vehicle 1 to enter the central region D after the front wheel 1F of the vehicle 1 reaches the front end of the parking space P, a traveling path is calculated so as to cause the vehicle 1 to travel in a state where the steering angle is fixed. Such a traveling path corresponds to the fixed steering angle path KK (refer to FIG. 6C). Accordingly, compared to a case where the vehicle 1 travels forward so as to cause the reference position 1A of the vehicle 1 to enter the central region D while changing the steering angle, the traveling distance at the time when the vehicle 1 proceeds to the central region D can be shortened.

In the present embodiment, the centering path calculation unit 15 calculates the centering path DK including a direction adjustment path HK along which the vehicle 1 travels forward so as to cause the vehicle length direction ML of the vehicle 1 to be parallel to the longitudinal direction PL of the parking space P after traveling along the fixed steering angle path KK. Here, as described above, after traveling along the fixed steering angle path KK, the reference position 1A of the vehicle 1 enters the central region D as illustrated in FIG. 6C. Meanwhile, as illustrated in FIG. 6C, as a result of traveling along the fixed steering angle path KK, the vehicle length direction ML of the vehicle 1 is oriented toward a side of the position after traveling the fixed steering angle path KK from the position where the position of the front wheel 1F of the vehicle 1 reaches the front end of the parking space P. In this manner, the path along which the vehicle 1 travels in such a case is named as the direction adjustment path HK (refer to FIG. 6O) for the reason that the vehicle length direction ML of the vehicle 1 is adjusted so as to cause the vehicle length direction ML of the vehicle 1 to be parallel to the longitudinal direction PL, that is, to cause the vehicle length direction ML to be parallel to the central region D. Accordingly, it is possible to cause the reference position 1A of the vehicle 1 to be positioned at the central portion of the parking space P in the width direction PM and to cause the vehicle length direction ML of the vehicle 1 to be in a state of being parallel to the longitudinal direction Ft of the parking space P.

The reverse path calculation unit 16 calculates a reverse path BK along which the vehicle 1 after traveling the centering path DK travels reversely to the parking space P. After traveling the centering path DK, as described above, the vehicle 1 is in a state where the reference position 1A of the vehicle 1 is positioned at the central portion of the parking space P in the width direction PM, and the vehicle length direction ML of the vehicle 1 is parallel to the longitudinal direction PL of the parking space P. Therefore, the reverse path BK corresponds to a path along which the vehicle 1 travels from the position after traveling the centering path DK in a neutral steering angle state (refer to FIG. 6E). When the vehicle 1 travels reversely along such a reverse path BK, the vehicle 1 can be parked in the central portion of the parking space P in the width direction PM.

The guidance unit 17 guides the vehicle 1 which stops at the parking space P to perform the three-point-turn traveling based on the obliqueness correction path KR, the fixed steering angle path KK, the centering path DK including the direction adjustment path HK, and the reverse path BK. Regarding the guidance by the guidance unit 17, the vehicle 1 may be guided by controlling the steering and a traveling mechanism so as to automatically travel, or may be guided by audio or display on a monitor which is also used as a touch panel. In this manner, the parking support apparatus 100 supports the three-point-turn traveling of the vehicle 1 performed by a driver.

Figure 6A:
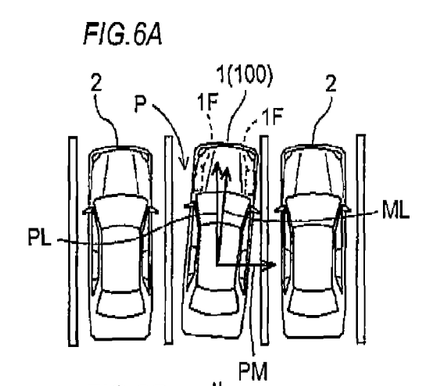
FIG. 6A is a diagram illustrating three-point-turn traveling by the parking support apparatus (a diagram of a vehicle obliquely parked in a parking space)
Figure 6B:
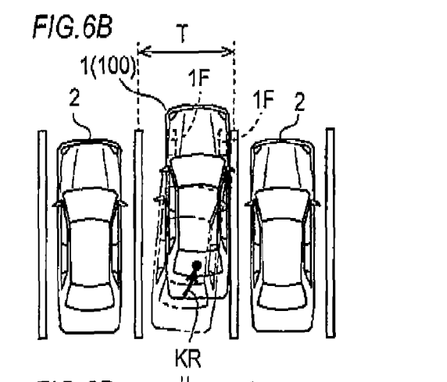
FIG. 6B is a diagram illustrating the three-point-turn traveling by the parking support apparatus (a diagram of the vehicle obliquely traveling forward so as not to deviate from the width of the parking space)
Figure 6C:
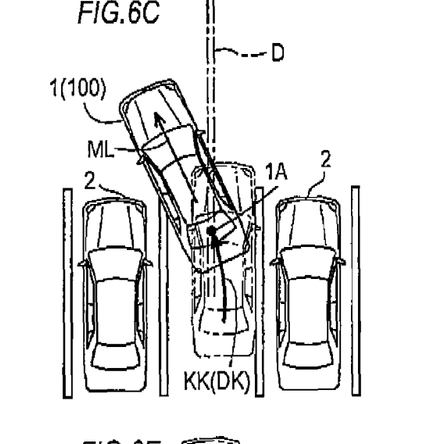
FIG. 6C is a diagram illustrating the three-point-turn traveling by the parking support apparatus (a diagram of the vehicle traveling at a fixed steering angle)
Figure 6D:
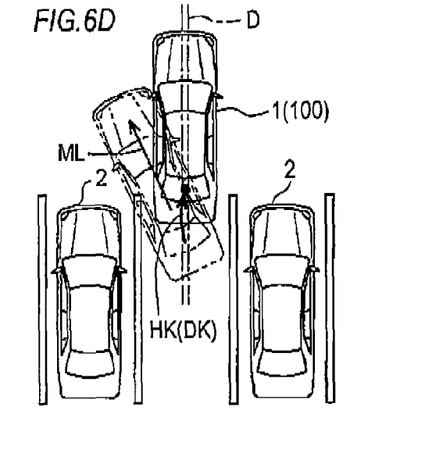
FIG. 6D is a diagram illustrating the three-point-turn traveling by the parking support apparatus (a diagram of the vehicle traveling so as to cause the vehicle length direction of the vehicle to be parallel to the central region)
Figure 6E:
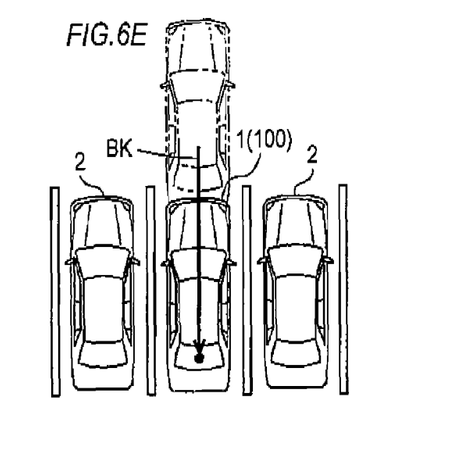
FIG. 6E is a diagram illustrating the three-point-turn traveling by the parking support apparatus (a diagram of the vehicle traveling reversely in a neutral steering angle state so as to be parked in the parking space)

Accordingly, as illustrated in FIGS. 6A to 6E, even when the vehicle 1 obliquely stops at the parking space P as in illustrated in FIG. 6A, the vehicle 1 travels forward and leaves the parking space P along the obliqueness correction path KR so as to cause the vehicle 1 not to deviate from the width T of the parking space P as illustrated in FIG. 6B. Moreover, the vehicle 1 travels along the fixed steering angle path KK at a fixed steering angle as illustrated in FIG. 6C so that the reference position 1A of the vehicle 1 can move to the central side of the parking space P without colliding with an object vehicle 2 which is parked adjacent to the parking space P. Thereafter, as illustrated in FIG. 6D, the vehicle 1 travels along the direction adjustment path HK so as to cause the vehicle length direction ML of the vehicle 1 to be parallel to the central region D so that the vehicle 1 can move to the position in the front of the central portion of the parking space P in the width direction PM. Therefore, as illustrated in FIG. 6E, the vehicle 1 travels reversely along the reverse path BK in a neutral steering angle state, and thus, the vehicle 1 can be parked in the central portion of the parking space P in the width direction PM.

Figure 7:
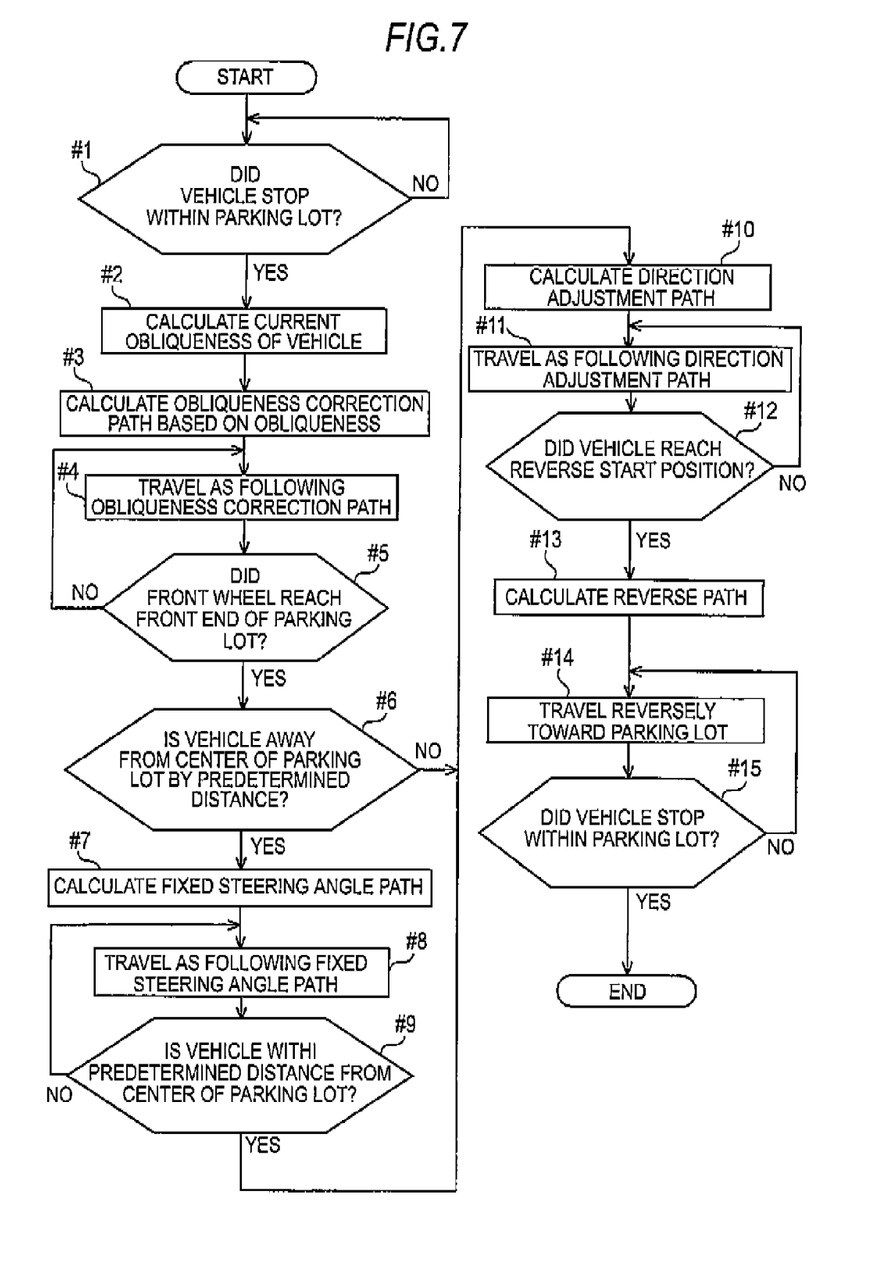
FIG. 7 is a flow chart illustrating processing by the parking support apparatus.

Subsequently, processing performed by the parking support apparatus 100 will be described with reference to the flow chart in FIG. 7. Firstly, when the vehicle 1 stops within the parking space P (Step #1: Yes), the obliqueness calculation unit 13 calculates a current obliqueness of the vehicle 1 according to the parking space information transmitted from the parking space information acquisition unit 11 and the host vehicle positional information transmitted from the host vehicle positional information acquisition unit 12 (Step #2).

Subsequently, the obliqueness correction path calculation unit 14 calculates the obliqueness correction path KR based on the obliqueness which is calculated by the obliqueness calculation unit 13 (Step #3). The guidance unit 17 guides the vehicle 1 along the obliqueness correction path KR (Step #4). The guidance by the guidance unit 17 is performed until the front wheel 1F of the vehicle 1 reaches the front end of the parking space P (Step #5: No). When the front wheel 1F of the vehicle 1 reaches the front end of the parking space P (Step #5: Yes), it is determined whether or not the vehicle 1 is away from the center of the parking space P by a predetermined distance (Step #6).

When the vehicle 1 is away from the center of the parking space P by a predetermined distance (Step #6: Yes), the centering path calculation unit 15 calculates the fixed steering angle path KK (Step #7). The guidance unit 17 guides the vehicle 1 along the fixed steering angle path KK (Step #8). The guidance by the guidance unit 17 is performed until the vehicle 1 moves within a predetermined distance from the center of the parking space P (Step #9: No).

When the vehicle 1 moves within a predetermined distance from the center of the parking space P (Step #9: Yes), the centering path calculation unit 15 calculates the direction adjustment path HK (Step #10). In Step #6, even when the vehicle 1 is not away from the center of the parking space P by a predetermined distance (Step #6: No), the centering path calculation unit 15 calculates the direction adjustment path HK (Step #10). The guidance unit 17 guides the vehicle 1 along the direction adjustment path HK (Step #11). The guidance by the guidance unit 17 is performed until the vehicle 1 reaches a reverse start position (Step #12: No).

When the vehicle 1 reaches the reverse start position (Step #12: Yes), the reverse path calculation unit 16 calculates the reverse path BK (Step #13). The guidance unit 17 guides the vehicle 1 along the reverse path BK (Step #14). The guidance by the guidance unit 17 is performed until the vehicle 1 reaches the parking space P (Step #15: No), and when the vehicle 1 reaches the parking space P, the processing (Step #15: Yes) is ended thereby.

Other Embodiments

In the embodiment described above, after the front wheel 1F of the vehicle 1 reaches the front end of the parking space P, the centering path calculation unit 15 calculates the centering path DK including the fixed steering angle path KK along which the vehicle 1 travels forward toward the central region D being fixed at a certain steering angle. However, the application scope of the embodiment disclosed here is not limited thereto. After traveling the obliqueness correction path KR, when the reference position 1A of the vehicle 1 is positioned in the vicinity of the central region D, the centering path DK calculates the direction adjustment path HK without calculating the fixed steering angle path KK. Accordingly, the vehicle 1 can be guided to the reverse start position which is in front of the parking space P. Thereafter, the vehicle 1 reverses from the reverse start position along the reverse path BK calculated by the reverse path calculation unit 16, and thus, the vehicle 1 can be parked in the central portion of the parking space P.

In the embodiment described above, after traveling the fixed steering angle path KK, the centering path calculation unit 15 calculates the centering path DK including the direction adjustment path HK along which the vehicle 1 travels forward so as to cause the vehicle length direction ML of the vehicle 1 to be parallel to the longitudinal direction PL of the parking space P. However, the application scope of the embodiment disclosed here is not limited thereto. After traveling the obliqueness correction path KR, when the reference position 1A of the vehicle 1 is positioned at the central region D, since the vehicle 1 is positioned in front of the parking space P, the reverse path calculation unit 16 calculates the reverse path BK. Accordingly, the vehicle 1 reverses from the reverse start position along the reverse path BK calculated by the reverse path calculation unit 16, and thus, the vehicle 1 can be parked in the central portion of the parking space P.

Figure 8A:
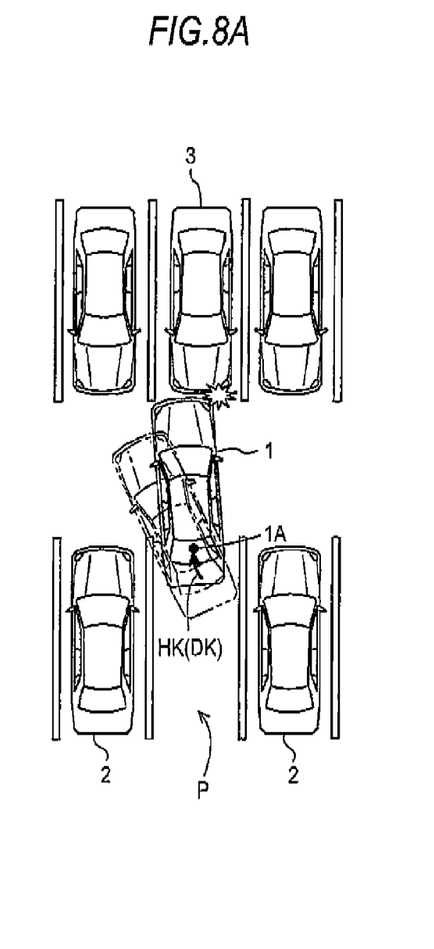
FIG. 8A is a diagram illustrating another example of the three-point-turn traveling by the parking support apparatus (a diagram of a vehicle determined to come into contact with an object in front of the parking lot)
Figure 8B:
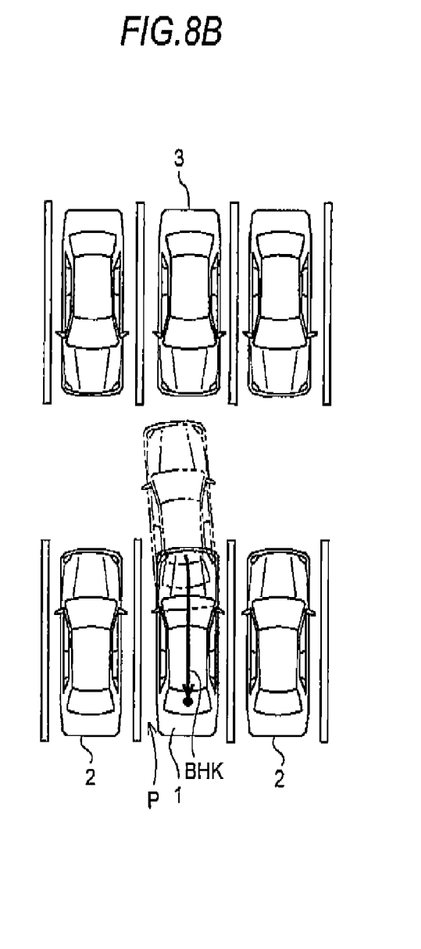
FIG. 8B is a diagram illustrating another example of the three-point-turn traveling by the parking support apparatus (a diagram of the vehicle guided to the parking space when the vehicle is determined to come into contact with the object).

In the embodiment described above, since the vehicle 1 is positioned in front of the parking space P after the direction adjustment path HK, when the vehicle 1 travels reversely along the reverse path BK in a neutral steering angle state, the vehicle 1 can move to the parking space P. However, for example, as illustrated in FIG. 8A, when the vehicle 1 traveling the centering path DK (the direction adjustment path HK) is determined to come into contact with an object (for example, an object vehicle 3) in front of the parking space P, it is favorable that the centering path calculation unit 15 calculates a reverse traveling adjustment path BHK along which the vehicle 1 travels reversely toward the parking space P from the position before the position to be in contact so as to cause the vehicle length direction ML of the vehicle 1 to be parallel to the longitudinal direction PL of the parking space P. In such a case, as illustrated in FIG. 8B, the vehicle 1 is guided along the reverse traveling adjustment path BHK, and thus, the vehicle 1 can be parked in the central portion of the parking space P.

Otherwise, when the vehicle 1 traveling along the centering path DK (the direction adjustment path HK) reaches the position set in advance in accordance with the width of the road L in the front of the parking space P, it is possible to configure the centering path calculation unit 15 to calculate the reverse traveling adjustment path BHK along which the vehicle 1 travels reversely toward the parking space P from a position before the position to be in contact so as to cause the vehicle length direction ML of the vehicle 1 to be parallel to the longitudinal direction PL of the parking space P. In such a case as well, as illustrated in FIG. 8B, the vehicle 1 is guided along the reverse traveling adjustment path BHK, and thus, the vehicle 1 can be parked in the central portion of the parking space P.

In the embodiment described above, the obliqueness between the vehicle length direction ML and the longitudinal direction PL corresponds to the angle θ indicating the angular difference between the longitudinal direction Ft and the vehicle length direction ML as illustrated in FIG. 4, and the parking support apparatus 100 supports the three-point-turn traveling which is performed to correct such obliqueness. However, the application scope of the embodiment disclosed here is not limited thereto. The obliqueness between the vehicle length direction ML and the longitudinal direction PL includes a case in which the positions of the vehicle length direction ML and the longitudinal direction PL are deviated from each other in the width direction PM of the parking space P even though the vehicle length direction ML and the longitudinal direction PL are parallel to each other. Therefore, according to the present parking support apparatus 100, it is possible to support the three-point-turn traveling which is performed to match the vehicle length direction ML and the longitudinal direction PL in a state where the vehicle length direction ML and the longitudinal direction PL are parallel to each other.

In the embodiment described above, a predetermined location of the vehicle 1 is the position of the front wheel 1F of the vehicle 1. However, the application scope of the embodiment disclosed here is not limited thereto. When the vehicle 1 travels forward at a predetermined steering angle, a predetermined location of the vehicle 1 may be a position determined by a position passing the innermost side in accordance with the steering angle in the vehicle 1. In other words, a predetermined location can be determined by a portion of the vehicle 1 passing the innermost side when the vehicle 1 turns at a predetermined steering angle.

The embodiment disclosed here can be adopted in a parking support apparatus supporting three-point-turn traveling performed to correct positional deviation of a vehicle which stops at a parking space.

An aspect of this disclosure is directed to a parking support apparatus including a host vehicle positional information acquisition unit that acquires host vehicle positional information indicating a current position of a vehicle which stops at a parking space; an obliqueness calculation unit that calculates obliqueness between a vehicle length direction of the vehicle which stops at the parking space and a longitudinal direction of the parking space, based on host vehicle positional information; an obliqueness correction path calculation unit that calculates an obliqueness correction path along which a predetermined location of the vehicle determined on the basis of a front end of the vehicle within a range equal to or less than a width of the parking space reaches a front end of the parking space, based on the obliqueness when the vehicle travels forward from a stop position of the vehicle at a predetermined steering angle; and a centering path calculation unit that calculates a centering path which has a predetermined width at a central portion of the parking space in a width direction orthogonal to the longitudinal direction thereof and along which the vehicle travels forward toward a central region set to extend from the parking space in the longitudinal direction, after a predetermined location of the vehicle reaches the front end of the parking space.

With this configuration, even when the vehicle which temporarily stops at the parking space does not stop at the central portion of the parking space in the width direction or when the longitudinal direction of the parking space and the vehicle length direction of the vehicle are not parallel to each other, the vehicle can leave the parking space without coming into contact with objects (for example, other vehicles) present around the host vehicle. After leaving the parking space, the vehicle can travel toward a position in the front of the central portion of the parking space in the width direction so that the vehicle can proceed toward the central portion of the parking space in the width direction by traveling reversely thereafter. In this manner, according to the parking support apparatus, a vehicle which stops at the parking space can be prevented from coming into contact with surrounding objects, and the three-point turn can be easily performed.

It is preferable that after a predetermined location of the vehicle reaches the front end of the parking space, the centering path calculation unit calculates the centering path including a fixed steering angle path along which the vehicle travels forward toward the central region being fixed at a certain steering angle.

With this configuration, for example, a vehicle can move to the central region by a short traveling distance by setting a steering angle in a range in which a traveling direction of the vehicle can be widely changed.

It is preferable that after traveling along the fixed steering angle path, the centering path calculation unit calculates the centering path including a direction adjustment path along which the vehicle travels forward so as to cause the vehicle length direction of the vehicle to be parallel to the longitudinal direction of the parking space.

With this configuration, positional deviation between the vehicle length direction of the vehicle and the longitudinal direction of the parking space occurred when traveling along the fixed steering angle path can be minimized by causing the vehicle to travel along the direction adjustment path.

It is preferable that when the vehicle traveling along the centering path is determined to come into contact with an object in front of the parking space, the centering path calculation unit calculates a reverse traveling adjustment path along which the vehicle travels reversely toward the parking space from a position before the position to be in contact so as to cause the vehicle length direction of the vehicle to be parallel to the longitudinal direction of the parking space.

With this configuration, even when the width of a road in the front of the parking lot is narrow, a vehicle can travel toward the central portion of the parking space of the vehicle in the width direction by causing the vehicle to travel reversely along the reverse traveling adjustment path.

It is preferable that when the vehicle traveling along the centering path reaches a position set in advance in accordance with a width of a road in the front of the parking space, the centering path calculation unit calculates a reverse traveling adjustment path along which the vehicle travels reversely toward the parking space from a position set in advance so as to cause the vehicle length direction of the vehicle to be parallel to the longitudinal direction of the parking space.

With this configuration, when the width of a road in the front of the parking space is narrow, a vehicle can travel toward the central portion of the parking space of the vehicle in the width direction by causing the vehicle to travel reversely along the reverse traveling adjustment path.

It is preferable that the vehicle travels reversely to the parking space and stops, and a predetermined location of the vehicle is a position of a front wheel of the vehicle.

With this configuration, a vehicle can leave the parking space without coming into contact with objects (for example, other vehicles) present around the host vehicle.

It is preferable that when the vehicle travels forward at a predetermined steering angle, a predetermined location of the vehicle is a position determined by a position passing the innermost side in accordance with the steering angle in the vehicle.

With this configuration, a vehicle can leave the parking space without coming into contact with objects (for example, other vehicles) present around the host vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking support apparatus for a vehicle comprising:
a vehicle positional information acquisition unit that acquires vehicle positional information indicating a current position of the vehicle which stops within a parking space;
an obliqueness calculation unit that calculates obliqueness between a vehicle length direction of the vehicle which stops at the parking space and a longitudinal direction of the parking space, based on the vehicle positional information;
an obliqueness correction path calculation unit that calculates an obliqueness correction path along with a predetermined location on the vehicle reaches a front end of the parking space, based on the obliqueness when the vehicle travels forward from the stopped current position of the vehicle at a predetermined steering angle, wherein the predetermined location on the vehicle is a location on the vehicle located within a range distance from the front end of the vehicle, the range distance being equal to or less than a width of the parking space;
a guidance unit that guides the vehicle along the obliqueness correction path;
a centering path calculation unit that calculates a centering path along which a reference position of the vehicle travels forward toward a central region set to extend from the parking space in the longitudinal direction and having a predetermined width at a central portion of the parking space in a width direction orthogonal to the longitudinal direction thereof after the predetermined location on the vehicle reaches the front end of the parking space; and
wherein the guidance unit further guides the vehicle along the centering path.

2. The parking support apparatus according to claim 1,
wherein after the predetermined location on the vehicle reaches the front end of the parking space, the centering path calculation unit calculates the centering path including a fixed steering angle path along which the vehicle travels forward toward the central region of the parking space while fixed at a certain steering angle.

3. The parking support apparatus according to claim 2,
wherein after the vehicle travels along the fixed steering angle path, and after traveling along the fixed steering angle path, the centering path calculation unit calculates a direction adjustment path along which the vehicle travels forward so as to cause the vehicle length direction of the vehicle to be parallel to the longitudinal direction of the parking space.

4. The parking support apparatus according to claim 3,
wherein when the vehicle traveling along the centering path is determined to come into contact with an object in front of the parking space, the centering path calculation unit calculates a reverse traveling adjustment path along which the vehicle travels reversely toward the parking space from a position before the position to be in contact so as to cause the vehicle length direction of the vehicle to be parallel to the longitudinal direction of the parking space.

5. The parking support apparatus according to claim 3,
wherein when the vehicle traveling along the centering path reaches a position set in advance in accordance with a width of a road in the front of the parking space, the centering path calculation unit calculates a reverse traveling adjustment path along which the vehicle travels reversely toward the parking space from a position set in advance so as to cause the vehicle length direction of the vehicle to be parallel to the longitudinal direction of the parking space.

6. The parking support apparatus according to claim 1,
wherein, after the vehicle travels forward, the vehicle travels reversely to the parking lot and stops, and
the predetermined location of the vehicle is a position of a front wheel of the vehicle.

7. The parking support apparatus according to claim 1,
wherein when the vehicle travels forward at the predetermined steering angle, the predetermined location on the vehicle is determined as a position of the vehicle passing a longitudinal axis of the innermost side of the parking space in accordance with the steering angle in the vehicle.

* * * * *